(12) United States Patent
Osborn et al.

(10) Patent No.: US 7,530,499 B2
(45) Date of Patent: May 12, 2009

(54) ULTRA-THIN, TWO-PIECE, SLIDE-TOGETHER CASE FOR A CD, DVD OR OTHER THIN LAMINAR ITEM

(76) Inventors: Warren R. Osborn, 4290 Vintage Cir., Provo, UT (US) 84604; Bryan P. Dunford, 598 N. 100 West, #13, Provo, UT (US) 84601

( * ) Notice: Subject to any disclaimer, the term of this patent is extended or adjusted under 35 U.S.C. 154(b) by 556 days.

(21) Appl. No.: 11/082,019

(22) Filed: Mar. 16, 2005

(65) Prior Publication Data
US 2006/0124749 A1   Jun. 15, 2006

Related U.S. Application Data

(63) Continuation-in-part of application No. 11/015,326, filed on Dec. 15, 2004, now Pat. No. 7,163,152.

(51) Int. Cl.
G06K 7/00 (2006.01)
(52) U.S. Cl. .................................. 235/486
(58) Field of Classification Search ............... 235/486; 206/308.1
See application file for complete search history.

(56) References Cited

U.S. PATENT DOCUMENTS

| | | | | |
|---|---|---|---|---|
| 5,433,319 A | * | 7/1995 | Tang | 206/308.1 |
| 5,520,279 A | * | 5/1996 | Lin | 206/308.1 |
| 5,549,199 A | * | 8/1996 | Lindsay | 206/308.1 |
| 6,776,282 B2 | * | 8/2004 | Lafleur | 206/308.1 |

* cited by examiner

Primary Examiner—Karl D Frech
Assistant Examiner—April A Taylor
(74) Attorney, Agent, or Firm—Angus C. Fox, III

(57) ABSTRACT

An ultra-thin, two-piece sheet metal case includes a receptacle and a lid. The receptacle is a generally rectangularly shaped tray-like item having rounded corners, a generally planar bottom panel, and a short perimetric wall extending from and unitary with the bottom panel, with outwardly rolled edges that form a tubular, semi-tubular, or fold-back flange. The lid of the case is slightly wider than the receptacle, and has a generally planar top portion which transitions to downwardly-bent walls on three sides thereof. The outer edges of the downwardly-bent walls are inwardly rolled to form a tubular, semi-tubular, or fold-back rim at the bottom thereof. The lid is designed and sized to slide over the receptacle so that the outwardly-rolled flange of the receptacle is trapped between the planar top panel and the inwardly-rolled rim of the lid.

20 Claims, 6 Drawing Sheets

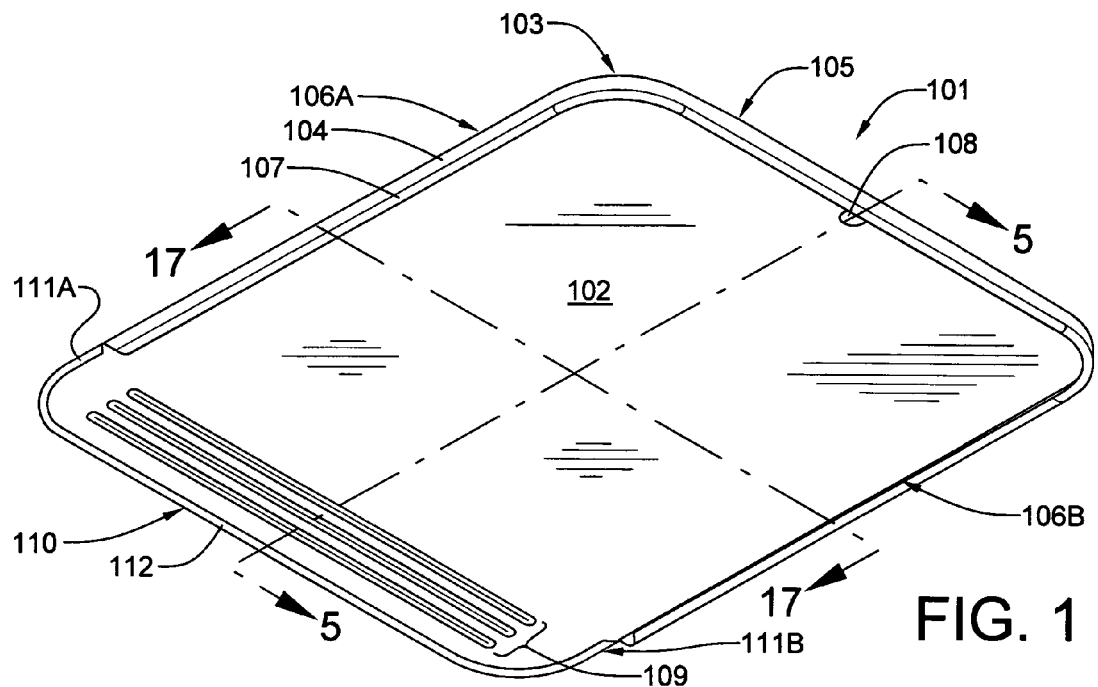
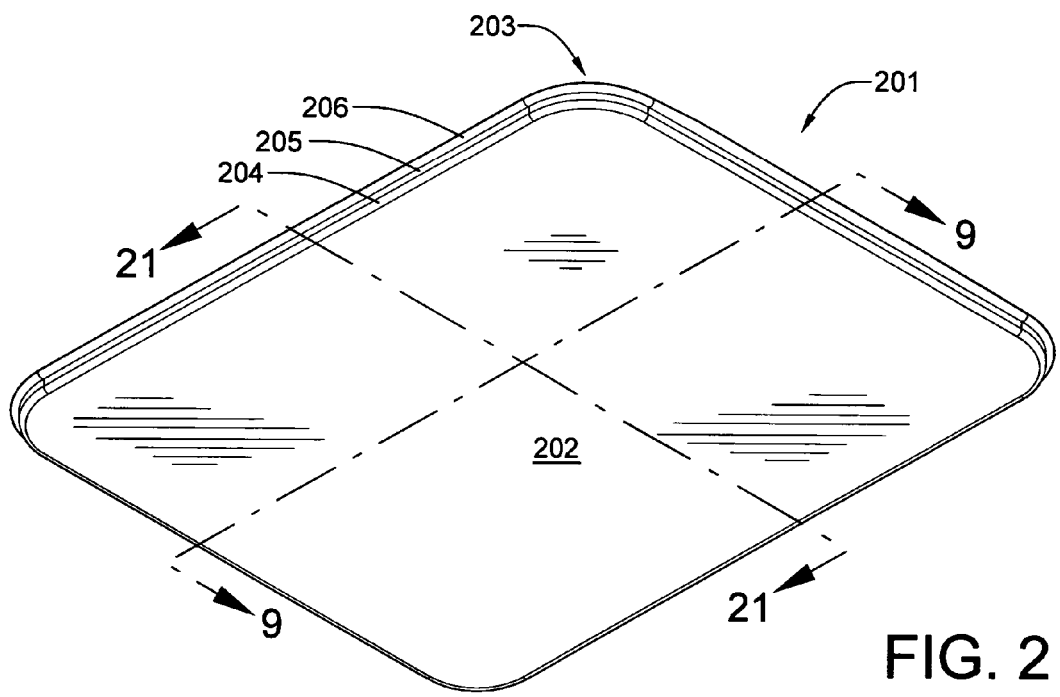

ULTRA-THIN, TWO-PIECE, SLIDE-TOGETHER CASE FOR A CD, DVD OR OTHER THIN LAMINAR ITEM

This is a continuation-in-part of application Ser. No. 11/015,326, titled PROTECTIVE CONTAINER FOR READABLE CARDS, which was filed on Dec. 15, 2004 now U.S. Pat. No. 7,163,152.

BACKGROUND OF THE INVENTION

1. Field of the Invention

The invention relates generally to protective containers or cases for storing and carrying thin laminar products, such as compact discs, digital video discs, magnetic cards, tickets or smart cards and, more particularly to two-piece slide-together containers that are stamped and formed from thin sheet metal.

2. History of the Prior Art

There are a multitude of very thin products which require protection during shipment and storage. Examples of such products are compact discs (CDs), digital video discs (DVDs), magnetic cards, tickets, gift cards. CDs and DVDs, in particular, require protection from breakage and abrasion during shipping and storage. Inexpensive cases, which are injection molded from semi-rigid polymeric plastic materials such as polystyrene, are quite brittle and tend to shatter if subjected to any significant impacts or unexpected loads. In addition, polymeric plastic cases offer little protection to magnetic cards from extraneous magnetic fields.

Internet Service Provider (ISP) companies, such as America Online (AOL) routinely mail millions of copies of service initiation CDs in thin packages to potential customers throughout the world. Their hope is that the potential customers will try the offered service and become long-term customers. It is imperative that the mailings to prospective customers attract the attention of those customers so that the mailed package will not be discarded as junk mail. Since any damaged container that is received by a potential customer is likely to be discarded, along with perfectly good enclosed CD, as junk, it is important that any packaging used by the ISPs be not only attractive, but relatively durable and inexpensive, as well. In addition, most ISPs that engage in mass mailing have thickness requirements for such containers. AOL, for example, mandates that containers for CD mailing be no thicker than 0.125 inch, or 3,175 millimeters.

Magnetic shielding prevents magnetic fields from reaching areas where they would otherwise cause magnetic interference or magnetic erasures. Magnetic shielding may be used around either the source of magnetic interference, to prevent electromagnetic radiation from leaving the source, or more typically, around a sensitive device, to prevent the electro magnetic interference from affecting operation of the sensitive device.

Permeability refers to a material's ability to attract and conduct magnetic lines of flux. The more conductive a material is to magnetic fields, the higher its permeability. Saturation is the limiting point of a material to conduct additional magnetic lines of flux. The saturation and permeability characteristics of a material are inversely related, therefore the higher a material's permeability, the lower its saturation point. Attenuation is a ratio used to measure the effectiveness of a given shield. Only magnetic materials are permeable. Non-magnetic materials—such as glass and wood—that allow magnetic lines of force to pass through them, are no permeable.

Unlike light in the visible spectrum, a magnetic field cannot be blocked or reflected; it can only be redirected. The use of shielding made of special shielding alloys possessing high permeability is the most effective way to redirect a magnetic field. These special alloys work by being attracted to the magnetic field, serving as a path for magnetic lines of flux so that they are diverted to the shielding material itself, thereby greatly reducing the strength of the magnetic field. It is important that the magnetic shielding offers a complete path for the magnetic field lines, so that they do not exit the material in a place where they will cause unintended interference or erasures. The most effective shielding alloys are about 80% nickel and 15% iron by weight, with the balance being copper, molybdenum or chromium, depending on the recipe being used. Mumetal®, CO-NETIC AA® and NETIC S3-6® are trademarks for alloys which have high magnetic permeability and provide magnetic field attenuation when used as magnetic shields.

Unlike some wave forms, magnetic fields do not travel in straight lines, but are in loops, starting from the magnetic radiation source and eventually returning there. Although shield calculation formulas do exist, they are usually valid only for theoretical conditions of closed shield shapes and well-described interference fields. Credit cards typically have a stripe which incorporates a thin layer of ferromagnetic particles. Information can be written on the card by selectively magnetizing regions of the ferromagnetic layer. Likewise, the card can be read by scanning the ferromagnetic layer and decoding the selectively magnetized regions. Unfortunately, when the entire card is subjected to a strong magnetic field, all information within the ferromagnetic layer will be erased.

Smart cards having an embedded integrated circuit are also becoming popular. A typical smart card incorporates a radio-frequency identification (RFID) tag. An RFID tag is usually a passive (having no on-board power source, such as a battery) and generally includes an antenna and an application specific integrated circuit (ASIC). The RFID tag receives its operational energy from a reader device, which must be in close proximity. Within what is termed the surveillance zone, the reader generates sufficient power to excite, or interrogate, the RFID tag. When radio frequency energy emanating from the reader antenna impinges on the tag, a current is induced in tag antenna. This induced current is routed to the ASIC, which then performs an initialization sequence. When the reader ceases transmitting its energy transmitting interrogation signal, the ASIC begins to broadcast its identity and any other requested information over the tag antenna. The tag transmission process utilizes low-energy transmission technology that selectively reflects the electromagnetic energy back to the reader at the same fundamental frequency as it was received, using the tag antenna as an energy radiator. The transmit/receive frequency employed is generally application dependent. Commonly available proximity interrogation systems operate at frequencies in a range of 60 kHz to 5.8 GHz, and typically employ frequency modulation for data transmission. Information reflected by the tag 102 is decoded by the reader 101. RFID tags can also incorporate memory (64 kilobytes of memory is now common), which can be of a read-only type or of a read and write type. In any case, the circuitry on an RFID tag is sensitve to both static electricity and strong magnetic fields. Static electricity can have voltage levels of thousands of volts—enough to fry the delicate components in an integrated circuit which typically have operating voltages of less than 5 volts.

What is needed is a protective case which protects credit cards and smart cards from strong stray magnetic fields and static electricity. What is also needed is a multi-purpose, ultra-thin metal sheet metal container that can be used for the shipment and storage of CDs, DVDs and other thin laminar products, such as tickets, magnetic cards, and smart cards. The sheet metal container, if fabricated from a ferromagnetic sheet metal, will have the added benefit of providing protection to the enclosed product from stray magnetic fields. Additionally, any sheet metal will protect the enclosed product from static electrical discharges.

SUMMARY OF THE INVENTION

A primary object of the present invention is to provide a protective storage and carrying case for CDs, DVDs, credit cards, gift cards, and smart cards, which have either magnetically-coded information stored thereon or a querryable integrated circuit, such as a radio-frequency identification tag. The case is designed to protect the enclosed item from breakage and abrasion, as well as from strong magnetic fields and from static electricity which could either erase information that is magnetically encoded on a magnetic card, or destroy integrated circuitry on a smart card.

A secondary object of the present invention is to provide an ultra-thin, two-piece, sheet metal case having slide-together components. Ideally, the sheet metal case, when assembled, will have a thickness of no greater than 0.125 inch, or 3.175 millimeters.

The present invention provides several embodiments of a two-piece sheet metal gift, storage and carrying case for CDs, DVDs, gift cards, credit cards and smart cards having slide-together lid and receptacle components. The storage and carrying case is fabricated from sheet metal having a nominal thickness within a range of about 0.005 to 0.01 inch (0.127 to 0.254 millimeters). Optimum thickness for the preferred embodiments disclosed herein is deemed to be about 0.0075 inch (about 0.2 millimeters). If magnetic protection for the enclosed item is to be provided, the sheet metal must be ferromagnetic, such as mild steel, or a metal alloy having enhanced magnetic permeability containing nickel and iron. The inner surfaces of the protective storage and carrying case may, optionally, be coated with a soft or magnetically non-permeable material. The material may be cloth or felt, a polymeric plastic coating, flock fiber, or a plasma deposited dielectric material, which may include ceramics, non-ferrous oxides. Thus, the protective case is designed to greatly reduce the possibility that the enclosed item will be broken or abraded. Cases fabricated of ferromagnetic sheet metal will protect magnetically encoded information on enclosed cards. In addition, the protective case also protects sensitive integrated circuits from static electrical discharges by providing what is essentially a Faraday cage around the smart card or other enclosed item.

The ultra-thin, two-piece gift case of the present invention includes a receptacle and a lid. For preferred embodiments of the invention, the receptacle of the two-piece sheet metal gift case is a generally rectangularly shaped tray-like item having rounded corners, a generally planar bottom panel, and a short circumferential wall with outwardly rolled edges that form a tubular flange of circular cross-section, an oval or flattened tubular flange, a semi-tubular flange, or a minimum-height folded flange. The lid of the gift case is slightly wider than the receptacle, and has a generally planar top panel, which transitions to downwardly-bent walls on three sides thereof. The outer edges of the downwardly-bent walls are inwardly rolled or bent to form a tubular rim of circular cross-section, an oval or flattened tubular rim, a semi-tubular rim, or a minimum-height fold-back rim at the bottom thereof. In order to not exceed a desired maximum height for the case, a cylindrical flange is never used with a cylindrical rim. The use of reduced height rims and flanges greatly facilitates the fabrication of ultra-thin gift cases of this type.

The lid is designed and sized to slide over the receptacle so that the outwardly-rolled flange of the receptacle is trapped between the planar top panel and the inwardly-rolled rim of the lid. One or more linear lateral ribs may be stamped into the cover to facilitate its removal. In addition, a downward projecting locking dimple may be stamped into the planar top panel near the rear edge. As the flange of the receptacle is forced to slide under the dimple, the planar surface of the lid deforms, then returns to its original shape. In order to remove the lid, the planar surface must be deformed again as the flange of the receptacle slides under it. The position of the receptacle flange under the dimple represents a high-energy state, while the position of the receptacle flange on either side of the dimple represents a low-energy state in which the lid is "locked" on the receptacle.

BRIEF DESCRIPTION OF THE DRAWINGS (PHOTOGRAPHS)

FIG. 1 is an isometric bottom/side/rear view of the lid;

FIG. 2 is an isometric bottom/side/rear view of the receptacle;

Figure 4:
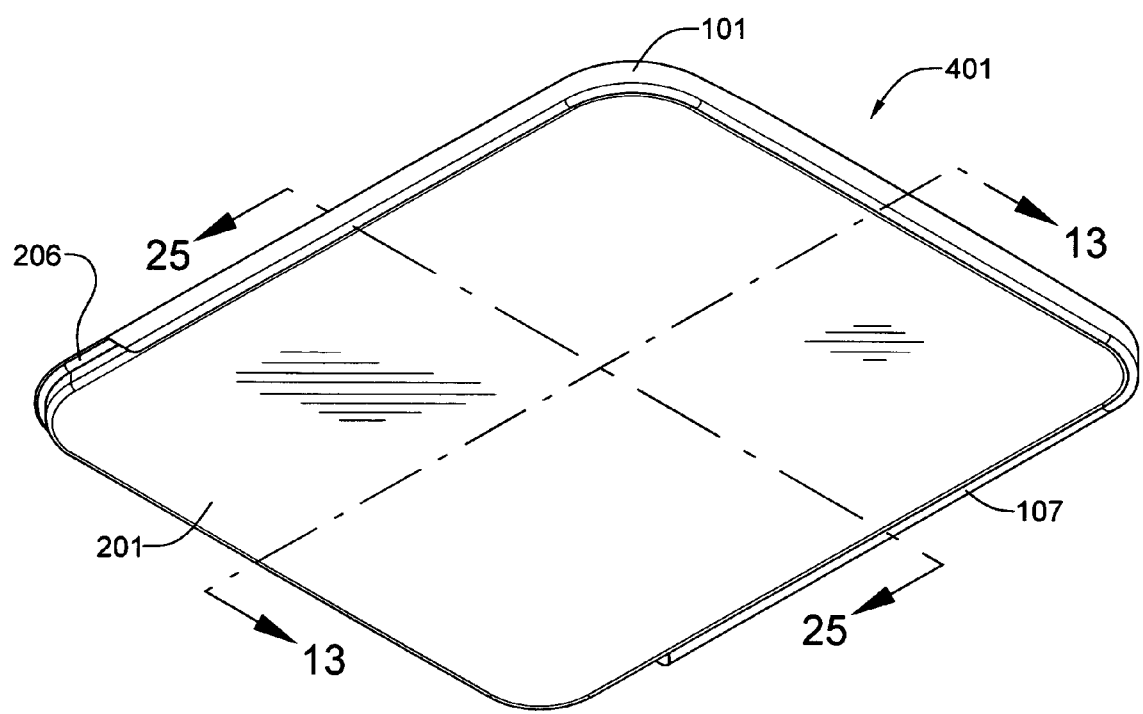
FIG. 4 is an isometric view of an assembled gift case, having the lid slid over the receptacle.
Figure 27:
Figure 28:

FIG. 27 is a thin slice view taken through section line 25-25 of the assembled case of FIG. 4, showing a lid having an inwardly-rolled rim with a full roll, and a receptacle having an outwardly-rolled flange with a reduced-height roll; and FIG. 28 is a thin slice view taken through section line 25-25 of the assembled case of FIG. 4, showing a lid having an inwardly-rolled rim with a partial roll, and a receptacle having an outwardly-rolled flange with a reduced-height roll.

DETAILED DISCLOSURE OF THE INVENTION

The present invention is designed as a protective storage and carrying case for CDs, DVDs, credit cards, gift cards, and smart cards, which have either magnetically-coded information stored thereon or a querryable integrated circuit, such as a radio-frequency identification tag. The case is designed to protect the enclosed item from breakage and abrasion, as well as from strong magnetic fields and from static electricity which could either erase information that is magnetically encoded on a magnetic card, or destroy integrated circuitry on a smart card. The case may also be used to gift, carry and store other thin laminar items, such as tickets or gift certificates. Throughout the remainder of this disclosure, the invention shall be referred to as simply a gift case.

The gift case of the present invention is an ultra-thin, two-piece, protective sheet metal case having slide-together components. The design and fabrication of the gift case is such that, when assembled, it can have a total height of less than 0.1 inch (2.54 millimeters). Several embodiments of the gift case are disclosed herein. The invention is intended to be fabricated from sheet metal having a nominal thickness within a range of about 0.005 to 0.01 inch (0.127 to 0.254 millimeters). Optimum thickness for the preferred embodiments disclosed herein is deemed to be about 0.0075 inch (about 0.2 millimeters). The sheet metal may be mild steel, brass, aluminum and aluminum alloys. If magnetic protection for the enclosed item is to be provided, the sheet metal must be ferromagnetic, such as mild steel, or a metal alloy having enhanced magnetic permeability containing nickel and iron. For optimum protection from stray magnetic fields, the metal alloy may have about 80% nickel and 15% iron by weight, with the balance being copper, molybdenum or chromium. The inner surfaces of the protective storage and carrying case may, optionally, be coated with a soft or magnetically non-permeable material. The material may be cloth or felt, a polymeric plastic coating, flock fiber, or a plasma deposited dielectric material, which may include ceramics, non-ferrous oxides. Thus, the protective case is designed to greatly reduce the possibility that the enclosed item will be broken or abraded. Cases fabricated of ferromagnetic sheet metal will protect magnetically encoded information on enclosed cards. In addition, the protective case also protects sensitive integrated circuits from static electrical discharges by providing what is essentially a Faraday cage around the smart card or other enclosed item. All embodiments of the gift case comprise two pieces: a receptacle and a lid. Various embodiments of the gift case of the present invention will now described in detail, with reference to the attached drawing figures.

Referring now to FIG. 1, the lid 101 of the ultra-thin, two-piece gift case has a generally planar and rectangular upper panel 102 with rounded corners 103. The rear lateral edge 105 and major portions of the opposing longitudinal edges 106A and 106B of the planar upper panel 102 transition to a downwardly extending wall 104. The outer edges of the downwardly extending wall 104 is inwardly rolled or bent to form a partially-perimetric rim 107. The rim 107, which is uniplanar, may be tubular, semi-tubular or a minimum height folded edge. A tubular rim may be of cylindrical, or oval or flatted circular cross section. A downwardly projecting locking dimple 108 may be stamped into the planar top panel 102 near the rear lateral edge. One or more linear lateral ribs 109 may be stamped into the cover to facilitate its removal from the receptacle. The front lateral edge 110 and minor portions of the longitudinal edges 111A and 111B have a folded edge 112 for safety and added rigidity.

Figure 3:
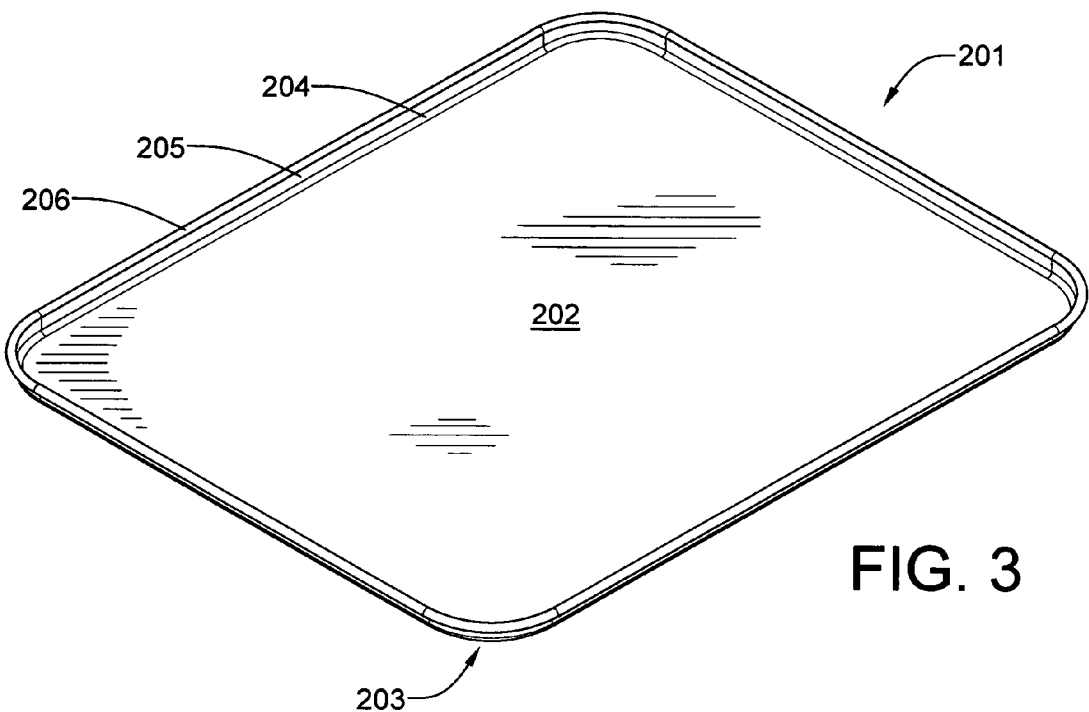
FIG. 3 is an isometric top/inner-side/inner-rear view of the receptacle.

Referring now to FIGS. 2 and 3, the receptacle 201 of the ultra-thin, two-piece gift case looks much like a miniature serving tray, and has a generally rectangular lower panel 202 with rounded corners 203. The outer edges of the lower panel 202 are continuous with a perimetric transition region 204 that is, in turn continuous with a short upwardly extending perimetric wall 205. Although the perimetric wall 205 is shown as being generally perpendicular to the lower panel 202, it may also form an obtuse angle with the lower panel. The top of the perimetric wall 205 has outwardly rolled or bent edges that form a perimetric flange 206. The perimetric flange 206, which is uniplanar, may be tubular, semi-tubular or a minimum height folded edge. As a semi-tubular flange may have an exposed sharp edge , and therefore not be as safe as a full tubular or bent edge, use of a semi-tubular flange on the receptacle 201 is it is not considered to be a preferred embodiment. On the other hand, the cut edge of a semi-tubular rim on the lid is much less exposed and can be used for that application.

Referring now to the assembled gift case 401 of FIG. 4, the lid 101 is designed and sized to slide over the receptacle 201 so that the outwardly-rolled or bent perimetric flange 206 of the receptacle 201 is trapped between the planar top panel 102 and the inwardly-rolled or bent partially-perimetric rim 107 of the lid 101. Thus, the lateral width of the lid 101 must be slightly greater than that of the receptacle 201.

As the perimetric flange 206 of the receptacle slides beneath the locking dimple 108, the planar surface of the lid's top panel 102 deforms, then returns to its original shape. In order to remove the lid 101 from the receptacle 201, the planar surface must be deformed again as the flange 206 of the receptacle slides under it in the opposite direction. The position of the receptacle's perimetric flange 206 under the locking dimple 108 represents a high-energy state, while the position of the perimetric flange 206 on either side of the locking dimple 108 represents a low-energy state in which the lid is "locked" on the receptacle.

Figure 5:
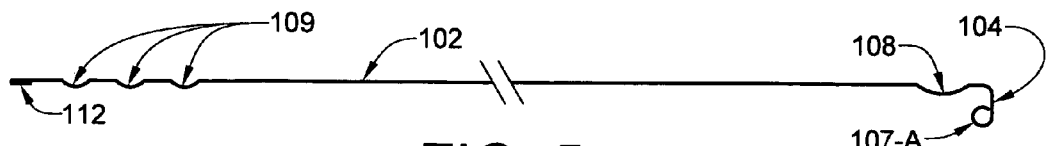
FIG. 5 is a thin slice view taken through section line 5-5 of FIG. 1, the inwardly-rolled rim having a first embodiment full roll.
Figure 6:
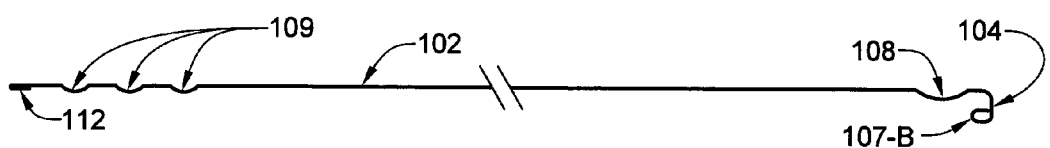
FIG. 6 is a thin slice view taken through section line 5-5 of FIG. 1, the inwardly-rolled rim having a second embodiment reduced-height full roll.
Figure 7:
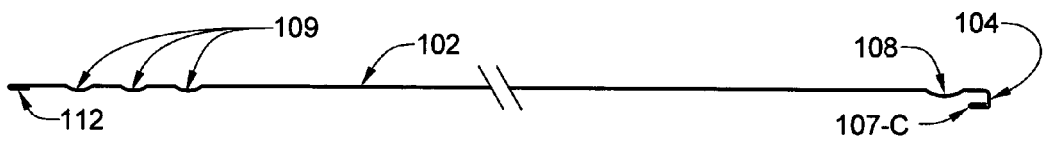
FIG. 7 is a thin slice view taken through section line 5-5 of FIG. 1, the inwardly-rolled rim having a third embodiment minimum-height folded rim.
Figure 8:
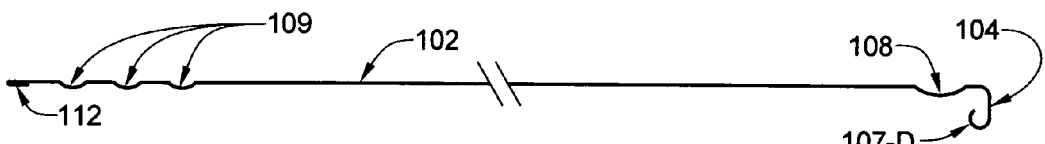
FIG. 8 is a thin slice view taken through section line 5-5 of FIG. 1, the inwardly-rolled rim having a fourth embodiment partial roll.

FIGS. 5 through 8 show various configurations that the partially-perimetric rim of the lid may have. FIG. 5 shows a thin slice of a lid 101 having an inwardly-rolled first embodiment tubular rim 107-A with a full roll of circular cross section. Such a rim does not lend itself to ultra-slim cases, and for the present invention, is used in combination with receptacles 201 having reduced-height perimetric flanges. FIG. 6 shows a thin slice of a lid 101 having an inwardly-rolled second embodiment tubular rim 107-B with an oval or flattened circular cross section; Such a configuration is useful in reducing the total height of the gift case. FIG. 7 shows a thin slice of a lid 101 having an inwardly-bent third embodiment rim 107-C with a minimum-height fold-back configuration. This shape of rim allows the fabrication of gift cases of greatly reduced height. FIG. 8 shows a thin slice of a lid 101 having an inwardly-rolled fourth embodiment rim 107-D with a partial roll. This configuration is useful not only for reducing height of the final product, but also for reducing sliding friction between the lid 101 and the receptacle 201.

Figure 9:
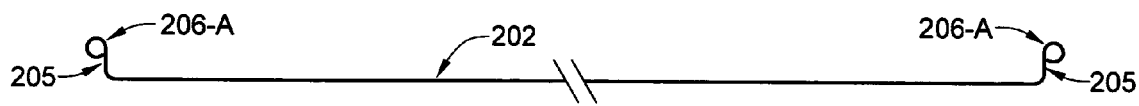
FIG. 9 is a thin slice view taken through section line 9-9 of the FIG. 2, the outwardly-rolled flange having a first embodiment full roll.
Figure 10:
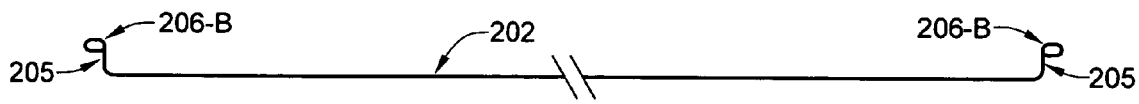
FIG. 10 is a thin slice view taken through section line 9-9 of the FIG. 2, the outwardly-rolled flange having a second embodiment reduced-height full roll.
Figure 11:
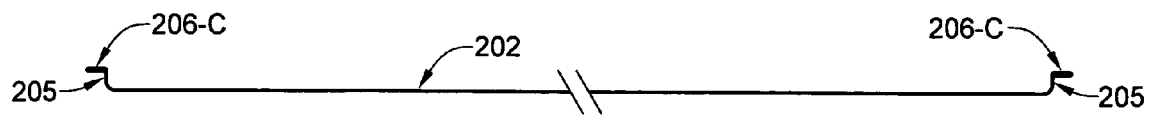
FIG. 11 is a thin slice view taken through section line 9-9 of the FIG. 2, the outward-rolled flange having a third embodiment minimum-height fold-back flange.
Figure 12:
FIG. 12 is a thin slice view taken through section line 9-9 of the FIG. 2, the outwardly-rolled flange having a fourth embodiment partial roll.

FIGS. 9 through 12 show various configurations that the fully-perimetric flange of the receptacle 201 may have. FIG. 9 shows a thin slice of a lid 201 having an outwardly-rolled first embodiment perimetric flange 206-A with a full roll of circular cross section. Such a flange does not lend itself to ultra-slim cases, and for the present invention, is used in combination with lids 101 having reduced-height rims. FIG. 10 shows a thin slice of a receptacle 201 having an outwardly-rolled second embodiment tubular flange 206-B with an oval or flattened circular cross section. Such a configuration is useful in reducing the total height of the gift case. FIG. 11 shows a thin slice of a receptacle 201 having an outwardly-bent third embodiment rim 206-C with a minimum-height fold-back configuration. This shape of flange allows the fabrication of gift cases-of greatly reduced height. FIG. 8 shows a thin slice of a receptacle 201 having an outwardly-rolled fourth embodiment flange 206-D with a partial roll. This configuration is not considered to be a preferred embodiment, as a sharp edge may be exposed.

FIGS. 13 through 16 show only four of sixteen possible combinations of lid and receptacle, using the different partially-perimetric rims 107 and perimetric flanges 206 disclosed above.

Figure 13:
FIG. 13 is a thin slice view taken through section line 13-13 of the assembled case of FIG. 4, showing a lid having a minimum height fold-back inwardly-rolled rim and a receptacle having a minimum height fold-back outwardly-rolled flange.

Referring now to FIG. 13, this thin slice view of a first embodiment assembled gift case 401-A shows a lid 101 having a minimum-height fold-back rim (see 107-C of FIG. 7) used in combination with a receptacle 201 having a minimum height fold-back flange (see 206-C of FIG. 11). Such a configuration facilitates the fabrication of minimum-height gift cases, as the rim 107-C and flange 206-C take up minimum height within the case assembly. Using sheet metal having a nominal thickness of 0.0075 inch (about 0.2 millimeters), gift cases as thin as 0.0625 inch (about 1.6 millimeters) may be fabricated. The controlling factor is the interior height of the case. For a gift case that is only 0.0625 inches in height, the interior will be less slightly than 0.05 in height, which is about the thickness of a conventional compact disc.

Figure 14:
FIG. 14 is a thin slice view taken through section line 13-13 of the assembled case of FIG. 4, showing a lid having an inwardly-rolled rim with a full roll, and a receptacle having a minimum-height fold-back outwardly-rolled flange.

Referring now to FIG. 14, this thin slice view of a second embodiment assembled gift case 401-B shows a lid having a rim with a full roll (see 107-A of FIG. 5) used in combination with a receptacle having a minimum-height fold-back flange (see 206-C of FIG. 11). The use of the fold-back flange compensates somewhat for the use of the full roll rim 107-A.

Figure 15:
FIG. 15 is a thin slice view taken through section line 13-13 of the assembled case of FIG. 4, showing a lid having an inwardly-rolled rim with a full roll, and a receptacle having an outwardly-rolled flange with a reduced-height roll.
Figure 16:
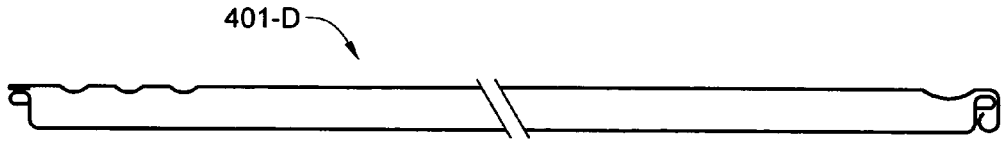
FIG. 16 is a thin slice view taken through section line 13-13 of the assembled case of FIG. 4, showing a lid having an inwardly-rolled rim with a partial roll, and a receptacle having an outwardly-rolled flange with a reduced-height roll.
Figure 17:
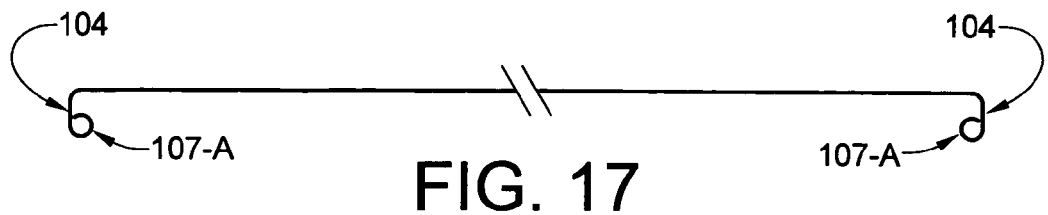
FIG. 17 is a thin slice view taken through section line 17-17 of FIG. 1, the inwardly-rolled rim having a first embodiment full roll.
Figure 18:
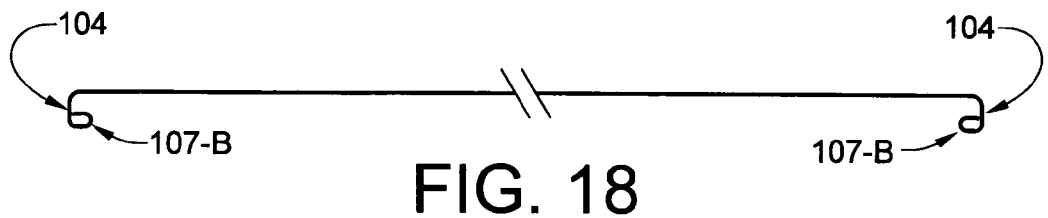
FIG. 18 is a thin slice view taken through section line 17-17 of FIG. 1, the inwardly-rolled rim having a second embodiment reduced-height full roll.
Figure 19:
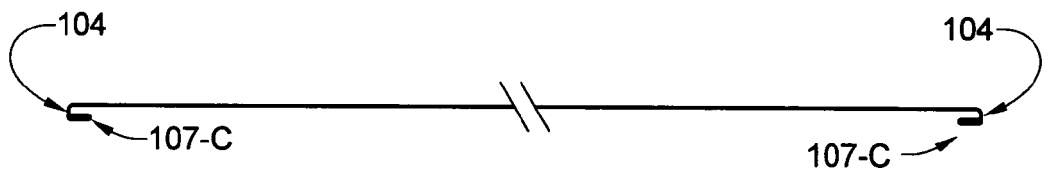
FIG. 19 is a thin slice view taken through section line 17-17 of FIG. 1, the inwardly-rolled rim having a third embodiment minimum-height fold-back rim.
Figure 20:
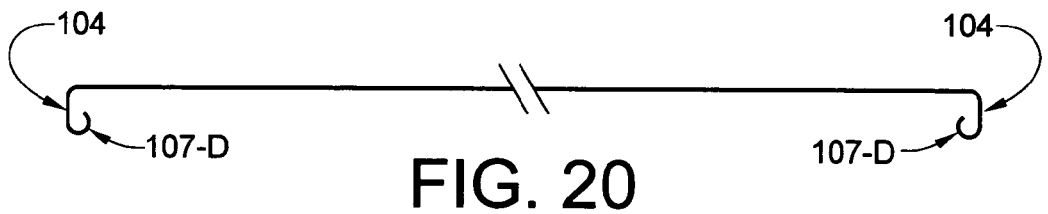
FIG. 20 is a thin slice view taken through section line 17-17 of FIG. 1, the inwardly-rolled rim having a fourth embodiment partial roll.
Figure 21:
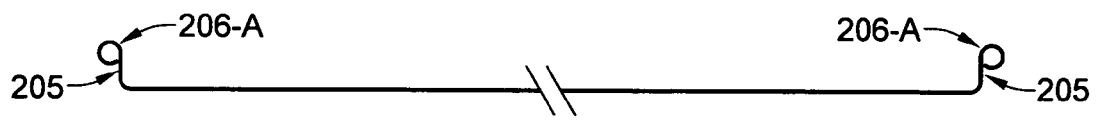
FIG. 21 is a thin slice view taken through section line 21-21 of the FIG. 2, the outwardly-rolled flange having a first embodiment full roll.
Figure 22:
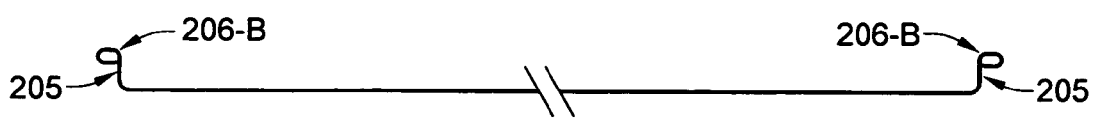
FIG. 22 is a thin slice view taken through section line 21-21 of the FIG. 2, the outwardly-rolled flange having a second embodiment reduced-height full roll.
Figure 23:
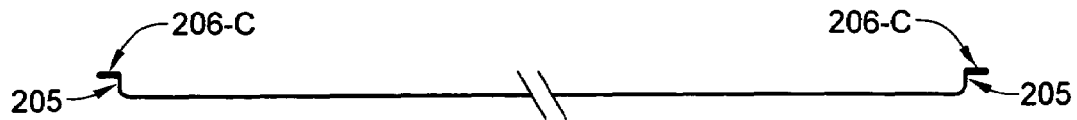
FIG. 23 is a thin slice view taken through section line 21-21 of the FIG. 2, the outward-rolled flange having a third embodiment minimum-height fold-back flange.
Figure 24:
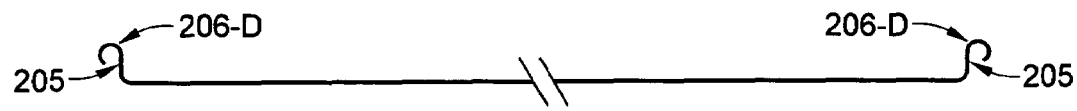
FIG. 24 is a thin slice view taken through section line 21-21 of the FIG. 2, the outwardly-rolled flange having a fourth embodiment partial roll.
Figure 25:
FIG. 25 is a thin slice view taken through section line 25-25 of the assembled case of FIG. 4, showing a lid having a minimum height fold-back inwardly-rolled rim and a receptacle having a minimum height fold-back outwardly-rolled flange.
Figure 26:
FIG. 26 is a thin slice view taken through section line 25-25 of the assembled case of FIG. 4, showing a lid having an inwardly-rolled rim with a full roll, and a receptacle having a minimum-height fold-back outwardly-rolled flange.

Referring now to FIG. 15, this thin slice view taken through section line 13-13 of a third embodiment assembled gift case 401-C, shows a lid having an inwardly-rolled rim with a full roll, and a receptacle having an outwardly-rolled flange with a reduced-height roll;

FIG. 16 is a thin slice view taken through section line 13-13 of a fourth embodiment assembled gift case 401-D, shows a lid having a rim with a partial roll (see 107-D of FIG. 8) used in combination with a receptacle a flange with a flattened circular cross-section (see 206-B of FIG. 10). Using this combination, it is possible to fabricate a gift case having a total height of less than 0.125 inch (about 3.2 millimeters).

FIGS. 17 through 20 show thin slice views through lids having the four different types of rims. The discussion above relating to FIGS. 5 through 8 respectively applies to FIGS. 17 through 20, as well.

FIGS. 21 through 24 show thin slice views through receptacles having the four different types of flanges. The discussion above relating to FIGS. 9 through 12 applies to FIGS. 21 through 24, as well.

FIGS. 25 through 28 show thin slice view through assembled cases having the combination of lid and receptacle as already described while respectively referring to FIGS. 13 through 16 above.

The focus of the present invention is the fabrication of ultra-thin, two-piece, slide-together gift cases using not more than one rim 107 or flange 206 of circular cross section. The use of reduced height rims and flanges greatly facilitates the fabrication of ultra-thin gift cases of this type.

Although only several embodiments of the present invention has been disclosed herein, it will be obvious to those having ordinary skill in the art that changes and modifications may be made thereto without departing from the scope and spirit of the invention as hereinafter may be claimed.

What is claimed is:

1. A two-piece, slide-together case for optical media, said case comprising:

a receptacle formed from sheet metal, said receptacle having a generally planar and rectangular lower panel, said lower panel having outer edges that are continuous with an upwardly extending perimetric wall, said perimetric wall terminating in an outwardly projecting perimetric uniplanar flange having a first cross section;

a lid formed from sheet metal, said lid having a generally planar and rectangular upper panel, said upper panel having outer edges that are continuous with a downwardly extending wall on three sides thereof, said downwardly extending wall terminating in an inwardly projecting partially perimetric uniplanar rim having a second cross section;

wherein said receptacle and said lid are shaped and sized so that a lower surface of said upper panel slides over said receptacle, with the outwardly projecting perimetric uniplanar flange of said receptacle becoming trapped between said lower surface and the inwardly projecting partially perimetric, uniplanar rim of said lid; and wherein of said first and second cross sections, not more than one is fully circular.

2. The two-piece, slide-together case of claim 1, wherein said first cross section is selected from the group consisting of circular, oval, flattened circular or folded edge.

3. The two-piece, slide-together case of claim 1, wherein said second cross section is selected from the group consisting of circular, oval, flattened circular or folded edge.

4. The two-piece, slide-together case of claim 1, wherein said first and second cross sections are both folded edge, and a total height of the assembled case is no greater than 0.1 inch (2.54 millimeters).

5. The two-piece, slide-together case of claim 1, wherein at least one lateral rib (109) is stamped into the lid to facilitate its removal from the receptacle.

6. The two-piece, slide-together case of claim 1, wherein a downwardly projecting locking dimple is stamped into the upper panel of the lid adjacent a rear edge.

7. The two-piece, slide-together case of claim 1, wherein the four corners of each of said generally rectangular upper and lower panels are rounded.

8. The two-piece, slide-together case of claim 1, wherein the sheet metal from which said receptacle and said lid are formed is selected from the group consisting of mild steel, stainless steel, aluminum, brass, and metal alloy containing nickel and iron having enhanced magnetic permeability.

9. The two-piece, slide-together case of claim 1, wherein said sheet metal has a nominal thickness within a range of 0.005 to 0.01 inch (0.127 to 0.254 millimeters).

10. The two-piece, slide-together case of claim 1, wherein a front lateral edge and minor adjacent portions of a pair of longitudinal edges are equipped with a folded edge for safety and added rigidity.

11. A two-piece, slide-together case for optical media, said case comprising:
   a receptacle formed from sheet metal, said receptacle having a generally rectangular lower panel, a upward extending wall that surrounds and is continuous with said lower panel, and an outwardly projecting perimetric flange continuous with said wall;
   a lid formed from sheet metal, said lid having a generally rectangular upper panel, said upper panel continuous with a downward extending wall on three sides, said downward extending wall terminating in an inwardly projecting partially perimetric rim;
   wherein said receptacle and said lid are shaped and sized so that a lower surface of said upper panel slides over said receptacle, with the outwardly projecting perimetric flange becoming trapped between said lower surface and the inwardly projecting partially perimetric rim of said lid; and
   wherein a cylindrical flange is never used with a cylindrical rim.

12. The two-piece, slide-together case of claim 11, wherein said first cross section is selected from the group consisting of circular, oval, flattened circular or folded edge.

13. The two-piece, slide-together case of claim 11, wherein said second cross section is selected from the group consisting of circular, oval, flattened circular or folded edge.

14. The two-piece, slide-together case of claim 11, wherein said first and second cross sections are both folded edge, and a total height of the assembled case is no greater than 0.1 inch (2.54 millimeters).

15. The two-piece, slide-together case of claim 11, wherein at least one lateral rib (109) is stamped into the lid to facilitate its removal from the receptacle.

16. The two-piece, slide-together case of claim 11, wherein a downwardly projecting locking dimple is stamped into the upper panel of the lid adjacent a rear edge.

17. The two-piece, slide-together case of claim 11, wherein the four corners of each of said generally rectangular upper and lower panels are rounded.

18. The two-piece, slide-together case of claim 11, wherein the sheet metal from which said receptacle and said lid are formed is selected from the group consisting of mild steel, stainless steel, aluminum, brass, and metal alloy containing nickel and iron having enhanced magnetic permeability.

19. The two-piece, slide-together case of claim 11, wherein said sheet metal has a nominal thickness within a range of 0.005 to 0.01 inch (0.127 to 0.254 millimeters).

20. The two-piece, slide-together case of claim 11, wherein a front lateral edge and minor adjacent portions of a pair of longitudinal edges are equipped with a folded edge for safety and added rigidity.

\* \* \* \* \*